(12) United States Patent
Kuroki et al.

(10) Patent No.: US 8,989,990 B2
(45) Date of Patent: Mar. 24, 2015

(54) WORKING GAS CIRCULATION TYPE ENGINE

(75) Inventors: Rentaro Kuroki, Susono (JP); Daisaku Sawada, Gotenba (JP); Akira Kato, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 237 days.

(21) Appl. No.: 13/498,612

(22) PCT Filed: Feb. 3, 2010

(86) PCT No.: PCT/JP2010/051527
§ 371 (c)(1),
(2), (4) Date: Mar. 28, 2012

(87) PCT Pub. No.: WO2011/096057
PCT Pub. Date: Aug. 11, 2011

(65) Prior Publication Data
US 2012/0285428 A1    Nov. 15, 2012

(51) Int. Cl.
| | | |
|---|---|---|
| F02B 47/08 | (2006.01) | |
| F02D 21/08 | (2006.01) | |
| F02B 47/00 | (2006.01) | |
| F02B 43/10 | (2006.01) | |
| F02B 47/10 | (2006.01) | |
| F02D 19/12 | (2006.01) | |
| F02D 21/04 | (2006.01) | |
| F02M 21/02 | (2006.01) | |
| F02M 25/07 | (2006.01) | |
| F02D 19/02 | (2006.01) | |

(52) U.S. Cl.
CPC ............... *F02B 47/00* (2013.01); *F02B 43/10* (2013.01); *F02B 47/10* (2013.01); *F02D 19/12* (2013.01); *F02D 21/04* (2013.01); *F02M 21/0206* (2013.01); *F02M 25/074* (2013.01); CPC ..... *F02D19/024* (2013.01); *Y02T 10/121* (2013.01); *Y02T 10/32* (2013.01); *F02M 21/0275* (2013.01)
USPC ..................................... 701/108; 123/568.21

(58) Field of Classification Search
CPC .. F02B 47/10; F02M 21/0206; F02M 25/074; F02D 19/12; F02D 21/04
USPC ......... 701/103, 108; 123/568.21, 27 GE, 525, 123/431, 198 A, 575; 73/114.71, 114.72, 73/114.74
See application file for complete search history.

(56) References Cited

U.S. PATENT DOCUMENTS

| 6,877,369 B2 * | 4/2005 | Matsunaga et al. ......... 73/114.74 |
|---|---|---|
| 6,944,530 B2 * | 9/2005 | Russell et al. ................. 701/104 |
| 6,994,077 B2 * | 2/2006 | Kobayashi et al. ...... 123/568.11 |
| 7,621,260 B2 * | 11/2009 | Mitani et al. ................... 123/527 |
| 7,748,217 B2 * | 7/2010 | Muller ............................ 60/602 |
| 7,788,922 B2 * | 9/2010 | Muller ............................ 60/602 |
| 2008/0245349 A1 | 10/2008 | Mitani et al. |
| 2011/0067363 A1 | 3/2011 | Kuroki et al. |

FOREIGN PATENT DOCUMENTS

| JP | 11-93681 | 4/1999 |
|---|---|---|
| JP | 2005-23850 | 1/2005 |
| JP | 2007-64092 | 3/2007 |
| JP | 2007-77834 | 3/2007 |
| JP | 2009-281208 | 12/2009 |
| WO | WO 2007/031839 | 3/2007 |
| WO | WO 2009/031005 | 3/2009 |
| WO | WO 2009/141706 | 11/2009 |

OTHER PUBLICATIONS

International Search Report in International Application No. PCT/JP2010/051527; Mailing Date: Apr. 20, 2010.

* cited by examiner

*Primary Examiner* — Hai Huynh
(74) *Attorney, Agent, or Firm* — Finnegan, Henderson, Farabow, Garrett & Dunner, LLP (57) ABSTRACT

A working gas circulation type engine includes a combustion chamber in which a working gas having a ratio of specific heats higher than that of air can be expanded by combustion of a fuel, a circulation path capable of circulating a gas containing the working gas from a gas exhaust side to a gas suction side of the combustion chamber and supplying the gas containing the working gas to the combustion chamber again, and a control device that changes a control parameter for controlling the combustion of the fuel based on a ratio of specific heats of the gas circulating in the circulation path. Therefore, there can be provided the working gas circulation type engine capable of obtaining a stable output.

11 Claims, 7 Drawing Sheets

WORKING GAS CIRCULATION TYPE ENGINE

CROSS-REFERENCE TO RELATED APPLICATIONS

This application is a national phase application of International Application No. PCT/JP2010/051527, filed Feb. 3, 2010, the contents of which are incorporated herein by reference.

FIELD

The present invention relates to a working gas circulation type engine.

BACKGROUND

As a conventional engine, there is known a working gas circulation type engine as a so-called closed cycle engine which can circulate a working gas from a gas exhaust side to a gas suction side of a combustion chamber and can supply the working gas to the combustion chamber again. As the conventional working gas circulation type engine, for example, Patent Literature 1 discloses an internal combustion engine which combusts hydrogen as a fuel in a combustion chamber as well as uses an inert gas as a working gas. The internal combustion engine removes water vapor as a product contained in a gas discharged from the combustion chamber by a water vapor removing device, circulates the inert gas from which the water vapor has been removed to the combustion chamber again via a circulation path as well as returns the molecules of the inert gas dissolved in the removed water to a gas state by a deaeration device and supplies also the molecules in the gas state to the combustion chamber again.

CITATION LIST

Patent Literature

Patent Literature 1: Japanese Patent Application Laid-open No. 2007-064092

SUMMARY

Technical Problem

Incidentally, in the internal combustion engine described in Patent Literature 1 as described above, when an unnecessary gas is mixed with a gas circulating in a circulation path such as when, for example, a gas (for example, the atmosphere) flows into a circulation path for circulating a working gas from an a gas exhaust side to a gas suction side of the combustion chamber, there is a possibility that a heat efficiency drops and thus there is a possibility that an stable output cannot be obtained.

An object of the present invention, which was made in view of the above circumstances, is to provide a working gas circulation type engine capable of obtaining a stable output.

Solution to Problem

In order to achieve the above mentioned object, a working gas circulation type engine according to the present invention includes a combustion chamber in which a working gas having a ratio of specific heats higher than that of air can be expanded by combustion of a fuel; a circulation path capable of circulating a gas containing the working gas from a gas exhaust side to a gas suction side of the combustion chamber and supplying the gas containing the working gas to the combustion chamber again; and a control device that changes a control parameter for controlling the combustion of the fuel based on a ratio of specific heats of the gas circulating in the circulation path.

Further, in the working gas circulation type engine, it is possible to configure that the control device changes the control parameter so that the combustion of the fuel is improved as the ratio of specific heats of the gas circulating in the circulation path becomes smaller.

Further, in the working gas circulation type engine, it is possible to configure that the control device changes the control parameter based on a pressure or a temperature of the gas circulating in the circulation path.

Further, in the working gas circulation type engine, it is possible to configure that the control parameter includes at least any one of a supply timing for supplying the fuel into the combustion chamber, an ignition timing for igniting the fuel in the combustion chamber, or a supply amount of the fuel supplied to the combustion chamber.

Further, in the working gas circulation type engine, it is possible to configure that the control device executes at least any one of control for advancing a supply timing for supplying the fuel to the combustion chamber as a ratio of specific heats of a gas circulating in the circulation path becomes smaller, control for advancing an ignition timing for igniting the fuel in the circulation path as a ratio of specific heats of a gas circulating in the circulation path becomes smaller, or control for increasing a supply amount of the fuel supplied to the combustion chamber as a ratio of specific heats of a gas circulating in the circulation path becomes smaller.

Advantageous Effects of Invention

The working gas circulation type engine according to the present invention achieves an effect that a stable output can obtain by that the control device changes the control parameter for controlling the combustion of the fuel based on the ratio of specific heats of the gas circulating in the circulation path.

DESCRIPTION OF EMBODIMENTS

Embodiments of the working gas circulation type engine according to the present invention will be explained below in detail based on the drawings. Note that the present invention is by no means limited by the embodiments. Further, the components in the embodiments include components which can be replaced by a person skilled in the art as well as are easy or include substantially the same components.

First Embodiment

Figure 1:
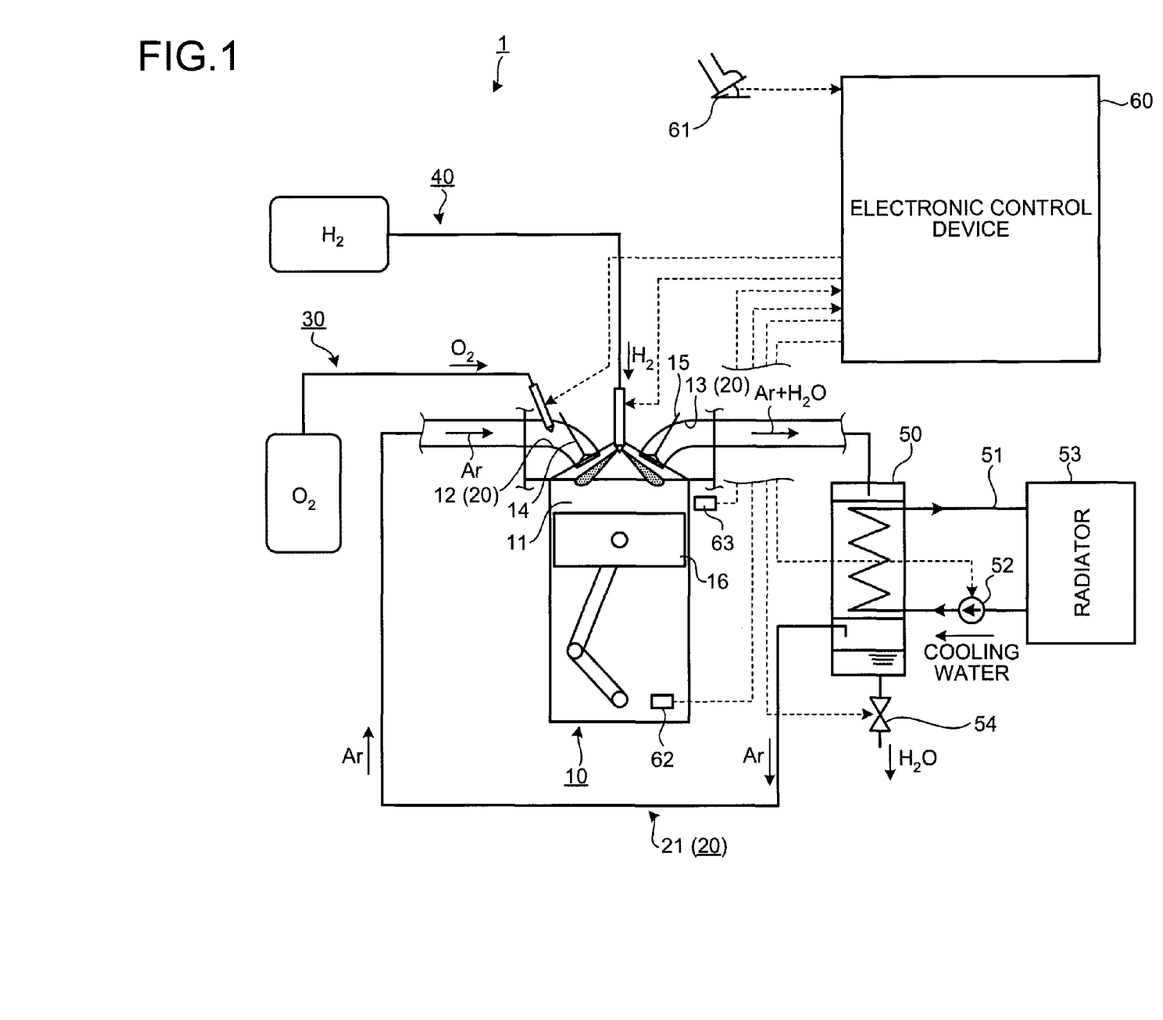
FIG. 1 is a schematic configuration view of an engine according to a first embodiment.
Figure 2:
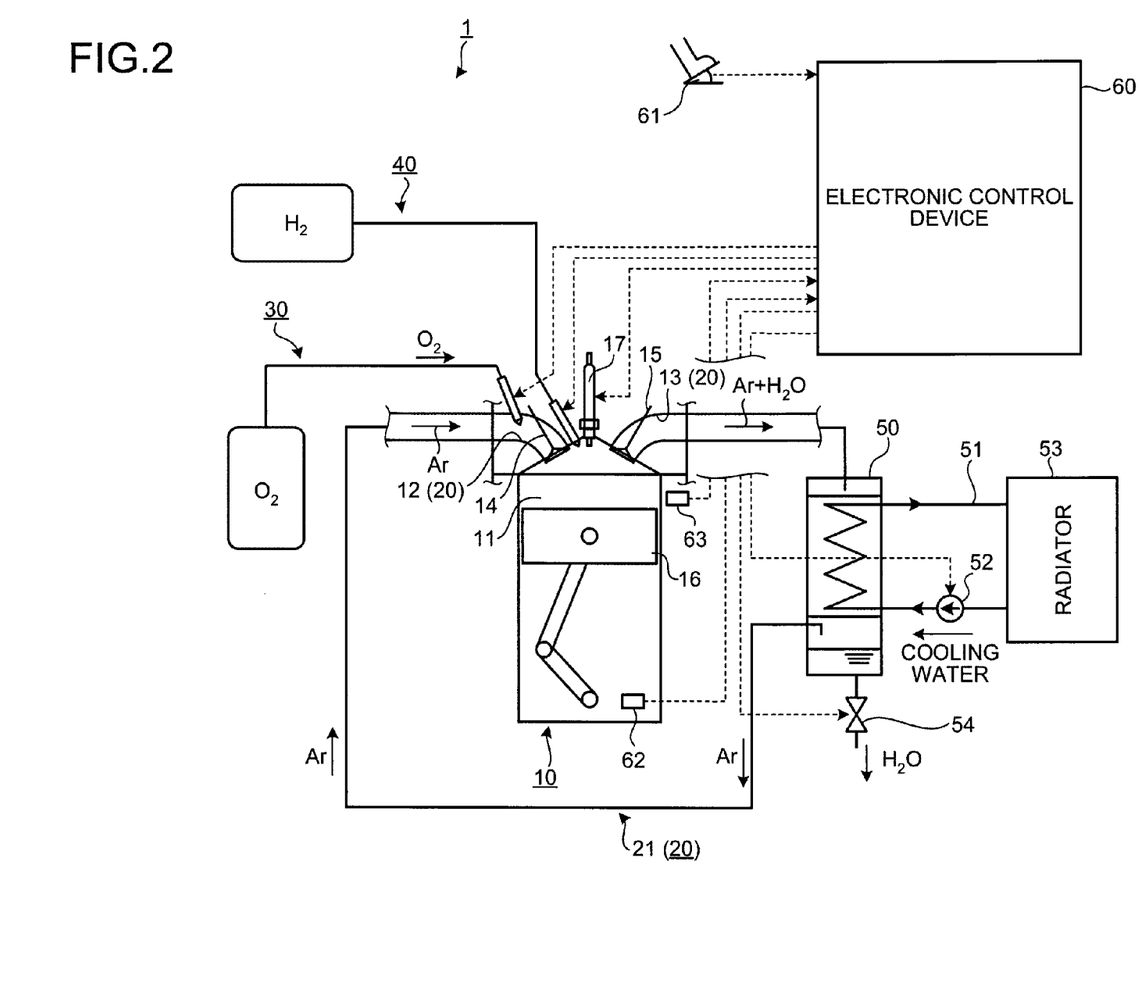
FIG. 2 is a schematic configuration view explaining other configuration of the engine according to the first embodiment.
Figure 3:
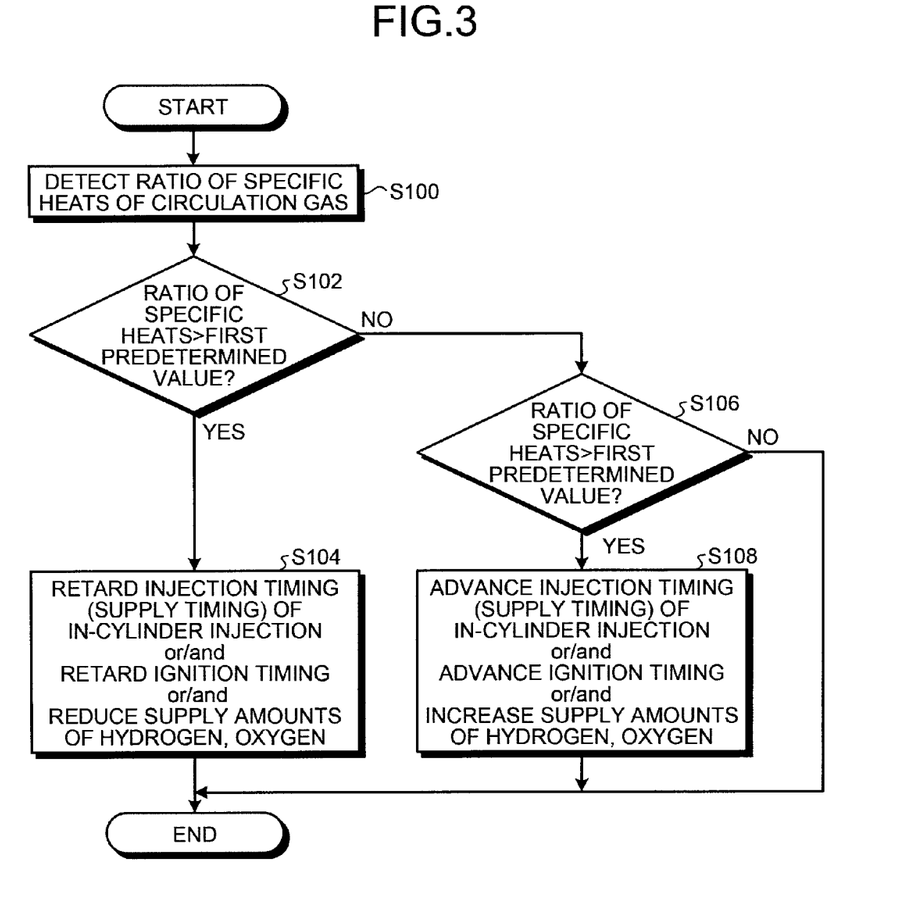
FIG. 3 is a flowchart explaining an example of control in the engine according to the first embodiment.
Figure 4:
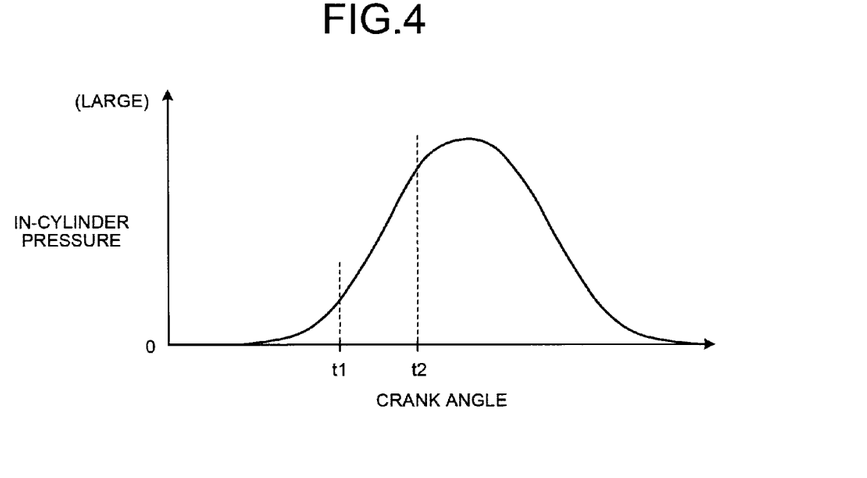
FIG. 4 is a schematic view explaining an example of detection of a ratio of specific heats in the engine according to the first embodiment.
Figure 5:
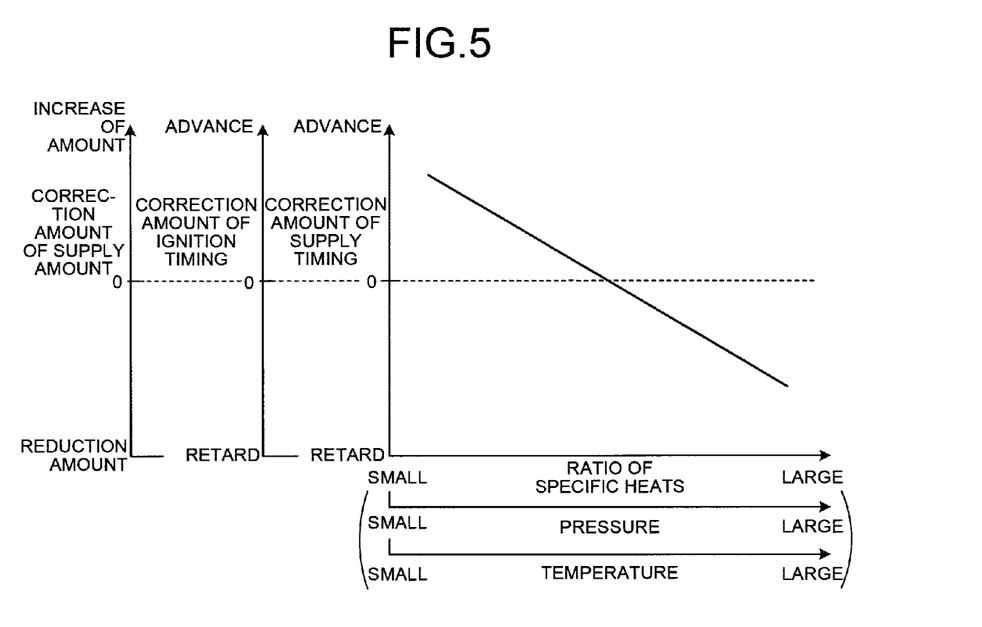
FIG. 5 is an example of a control map of the engine according to the first embodiment.

FIG. 1 is a schematic configuration view of an engine according to a first embodiment, FIG. 2 is a schematic configuration view explaining other configuration of the engine according to the first embodiment, FIG. 3 is a flowchart explaining an example of control in the engine according to the first embodiment, FIG. 4 is a schematic view explaining an example of detection of a ratio of specific heats in the engine according to the first embodiment, and FIG. 5 is an example of a control map of the engine according to the first embodiment.

An engine 1 as a working gas circulation type engine of the embodiment shown in FIG. 1 generates power by that an oxidizing agent, a fuel, and a working gas are supplied to a combustion chamber 11 of an engine main body 10 and the working gas is expanded by combustion of the fuel in the combustion chamber 11. Then, the engine 1 is a so-called closed cycle engine which is configured such that the engine 1 can circulate the working gas from a gas exhaust side to a gas suction side of the combustion chamber 11 via a circulation path 20 for connecting the gas suction side and the gas exhaust side of the combustion chamber 11 and can supply the working gas to the combustion chamber 11 again without basically discharging the working gas to the atmosphere. Both the combustion chamber 11 and the circulation path 20 are filled with the working gas and the working gas circulates between the combustion chamber 11 and the circulation path 20.

Here, the oxidizing agent used in the engine 1 is oxygen ($O_2$) and the fuel used in the engine 1 is hydrogen ($H_2$). Further, the working gas used in the engine 1 has a ratio of specific heats higher than that of air and is argon (Ar) which is a monoatomic gas here.

Specifically, as shown in FIG. 1, the engine 1 includes the engine main body 10 in which the combustion chamber 11 is disposed, the circulation path 20, an oxygen supply device 30, a hydrogen supply device 40, a condenser 50, and an electronic control device 60 as a control device.

The engine main body 10 is configured so as to include the combustion chamber 11 to which oxygen, hydrogen, and argon are supplied and in which the argon can be expanded by combustion of hydrogen. The combustion chamber 11 can exhaust the argon and water vapor ($H_2O$) as a combustion product after the combustion of hydrogen. Note that, although not shown, the engine main body 10 has plural combustion chambers 11 (cylinders). The circulation path 20 can circulate a circulation gas containing the argon from the gas exhaust side to the gas suction side of the combustion chamber 11 and can supply the circulation gas to the combustion chamber 11 again. The circulation path 20 is configured, including an suction port 12 and an exhaust port 13 communicating with the combustion chamber 11 and a circulation path 21 for connecting the suction port 12 and the exhaust port 13 at the outside of the combustion chamber 11 and basically forms a circulation system which is hermetically sealed to the outside air in its entirety.

Here, the circulation gas is a gas circulated from the gas exhaust side to the gas suction side of the combustion chamber 11 via the circulation path 20 and includes an exhaust gas exhausted from the combustion chamber 11 after the combustion of hydrogen in the combustion chamber 11 and the like in addition to the argon as the working gas. Here, the exhaust gas includes, for example, surplus oxygen remaining after the combustion of hydrogen in the combustion chamber 11, a surplus gas composed of hydrogen and the like, water vapor as a product produced by the combustion of hydrogen and the like. That is, the circulation gas here includes argon as the working gas, the surplus oxygen after combustion, the surplus gas composed of hydrogen and the like, the water vapor and the like.

The oxygen supply device 30 injects and supplies high pressure oxygen into the circulation path 20, that is, into the suction port 12 here and supplies the high pressure oxygen into the combustion chamber 11 together with the circulation gas containing argon and the like. The hydrogen supply device 40 directly injects and supplies high pressure hydrogen into the combustion chamber 11. The condenser 50 is disposed to the circulation path 20 and removes almost all the water vapor from the circulation gas circulating in the circulation path 20. When a cooling water pump 52 disposed to a cooling water circulation path 51 is driven, the condenser 50 is supplied with cooling water as a cooling medium cooled by a radiator 53 therein via the cooling water circulation path 51. Then, the condenser 50 cools the circulation gas by causing heat exchange between the circulation gas and the cooling water, liquefies and condenses the water vapor contained in the circulation gas, makes the water vapor to condensed water, and separates almost all the water vapor from the circulation gas. The condensed water condensed in the condenser 50 is discharged to outside of the circulating system of the circulation path 20 via a discharge valve 54.

The electronic control device 60 is an electronic circuit mainly composed of a known microcomputer including a CPU, ROM, RAM, and an interface. The electronic control device 60 is input with electric signals corresponding to results of detection detected by various sensors such as an accelerator opening degree sensor 61 for detecting an accelerator opening degree, a crank angle sensor 62 for detecting a crank angle, an in-cylinder pressure sensor 63 for detecting an in-cylinder pressure, and the like. Here, the accelerator opening degree corresponds to an operating amount of an accelerator pedal (not shown) disposed to a driver's seat of a vehicle, and more specifically is a value corresponding to a requested engine load (requested load rate) requested to the engine 1 by a driver. The crank angle corresponds to a rotation angle of a crank shaft coupled with a piston 16 via a connecting rod. The in-cylinder pressure corresponds to a pressure in the combustion chamber 11. The electronic control device 60 determines a suction stroke, a compression stroke, an expansion stroke, and an exhaust stroke in each cylinder based on, for example, a crank angle detected by the crank angle sensor 62 as well as calculates an engine number of revolutions (rpm) as a revolution speed of the engine 1. The electronic control device 60 outputs a drive signal to respective sections of the engine 1 such as the oxygen supply device 30, the hydrogen supply device 40, the cooling water pump 52, the discharge valve 54, and the like in response to the input results of detection and controls drives of the sections.

The engine 1 configured as described above is exemplified assuming that the engine 1 diffuses and combusts hydrogen. In the engine 1, when a suction valve 14 disposed to the suction port 12 is opened, the circulation gas circulating in the circulation path 20 is sucked (supplied) into the combustion chamber 11 together with oxygen from the oxygen supply device 30. In the engine 1, when the high pressure hydrogen is injected from the hydrogen supply device 40 into a high temperature compressed gas (oxygen and argon) formed in the combustion chamber 11 in response to an operation of the piston 16, a part of the hydrogen is self-ignited and the hydrogen and the compressed gas (oxygen) combust while being diffused and mixed. With the combustion, in the engine 1, water vapor is created in the combustion chamber 11 as well as argon having a large ratio of specific heats causes thermal expansion. As a result, since the piston 16 is depressed by the combustion of hydrogen and the thermal expansion of argon and the crank shaft is rotated, the engine 1 can generate mechanical power. Then, in the engine 1, when an exhaust valve 15 disposed to the exhaust port 13 is opened, the exhaust gas after the combustion of hydrogen is exhausted (discharged) to the exhaust port 13 together with argon from inside of the combustion chamber 11, and the exhaust gas and the argon circulate in the circulation path 20 as the circulation gas and are sucked into the combustion chamber 11 again. During the period, in the engine 1, almost all the water vapor in the circulation gas is liquefied, condensed, and separated by the condenser 50. With the operation, since the water vapor having a small ratio of specific heats is not supplied to the combustion chamber 11 and the argon having a large ratio of specific heats is supplied to the combustion chamber 11 again, the engine 1 can execute an operation having a high thermal efficiency by the argon.

During the period, the electronic control device 60 controls the supply amounts (injection amounts) and the supply timings (injection timings) of oxygen and hydrogen by the oxygen supply device 30, the hydrogen supply device 40 in response to the operation states such as the requested engine load, the engine number of revolutions, and the like based on the accelerator opening degree detected by the accelerator opening degree sensor 61, the crank angle detected by the crank angle sensor 62, and the like. The electronic control device 60 basically determines the supply amounts and the supply timings of the hydrogen and the oxygen by which the requested engine load requested to the engine 1 can be obtained at the engine number of revolutions at the time.

Note that although the engine 1 is exemplified as a configuration of an in-cylinder direct-injection self-ignition diffusion combustion type in which hydrogen is directly injected into the combustion chamber 11, self-ignited, and diffused and combusted, the engine 1 is not limited thereto. As shown in, for example, FIG. 2, the engine 1 may be a configuration of a spark ignition type which includes an ignition plug 17 as an ignition device capable of igniting hydrogen supplied to the combustion chamber 11 and the ignition plug 17 ignites hydrogen in the combustion chamber 11 or may be a configuration of a type in which hydrogen is diffused and combusted by that the hydrogen is ignited by the ignition plug 17 and assisted to cause self-ignition. Further, the engine 1 may be a configuration of a suction gas pre-mixing type in which, for example, hydrogen is injected and supplied into the circulation path 20, that is, into the suction port 12 here and the hydrogen is supplied to the combustion chamber 11 together with a circulation gas containing argon and the like. Further, the engine 1 may be a configuration of a type in which oxygen is directly injected into the combustion chamber 11. Further, the engine 1 may be a configuration of a so-called lean combustion type.

Incidentally, as described above, in the engine 1, although the circulation path 20 basically configures the circulation system in which the circulation path 20 is hermetically sealed to the outside air in its entirety, it is difficult to perfectly seal between the members which configure the circulation path 20 and to perfectly prevent the accumulation of unnecessary gases (for example, carbon dioxide ($CO_2$) generated by that engine oil combusts, and the like) generated in the combustion chamber 11. Accordingly, in the engine 1, there is a possibility that an argon ratio (argon concentration) in the circulation gas changes, the ratio of specific heats of the circulation gas changes, and the combustion condition of hydrogen in the combustion chamber 11 varies with a result that a heat efficiency drops by, for example, that unnecessary impure gases other than oxygen, hydrogen, argon, and the like are mixed in the circulation gas circulating the circulation path 20. With the operation, there is a possibility that the engine 1 cannot obtain a stable output.

Thus, in the engine 1 of the embodiment, the electronic control device 60 changes a control parameter for controlling the combustion of hydrogen in the combustion chamber 11 based on a parameter showing the state of the circulation gas circulating in the circulation path 20. With the operation, since the engine 1 can be operated so that a drive condition is optimized in response to the composition and the change of state of the circulation gas, the stable output can be obtained.

Specifically, the electronic control device 60 changes the control parameter based on the ratio of specific heats of the circulation gas circulating in the circulation path 20 as the parameter showing the state of the circulation gas. It is sufficient for the electronic control device 60 to detect the ratio of specific heats of the circulation gas circulating in the circulation path 20 by various known methods.

Here, the control parameter is an operation amount as to the hydrogen combustion in the combustion chamber 11 and is a value which affects the hydrogen combustion in the combustion chamber 11 via the engine main body 10. The control parameter here includes at least any one of the supply timing at which hydrogen is supplied to the combustion chamber 11, an ignition timing at which hydrogen in the combustion chamber 11 is ignited, or the supply amount of hydrogen supplied to the combustion chamber 11. That is, the electronic control device 60 changes any one or all of the supply amount (injection amount) of hydrogen, the supply timing (injection time) of hydrogen in the case of the in-cylinder direct injection type as in FIG. 1 and FIG. 2, and the ignition timing of hydrogen when the ignition plug 17 is provided as in FIG. 2 as the control parameter based on the ratio of specific heats of the circulation gas.

The electronic control device 60 changes the control parameter in response to the ratio of specific heats of the circulation gas by correcting a reference control parameter (reference supply timings, a reference ignition timing, reference supply amounts) acting as a reference by a predetermined correction amount in response to the ratio of specific heats of the circulation gas in the circulation path 20. The reference control parameter is determined in response to the operation states such as the requested engine load, the engine number of revolutions, and the like based on, for example, the accelerator opening degree, the crank angle, and the like as described above.

Specifically, the electronic control device 60 changes (corrects) the control parameter so that a smaller ratio of specific heats of the circulation gas in the circulation path 20 more improves the combustion of hydrogen. Here, the electronic control device 60 executes at least one of a control for advancing the supply timing at which hydrogen is supplied to the combustion chamber 11 as the ratio of specific heats of the circulation gas circulating in the circulation path 20 becomes smaller, a control for advancing the ignition timing at which the hydrogen in the combustion chamber 11 is ignited as the ratio of specific heats of the circulation gas circulating in the circulation path 20 becomes smaller or a control for increasing the supply amount of hydrogen supplied to the combustion chamber 11 as the ratio of specific heats of the circulation gas circulating in the circulation path 20 becomes smaller. With the operation, the engine 1 can improve the combustion of hydrogen as the ratio of specific heats of the circulation gas in the circulation path 20 becomes smaller.

When, for example, the engine 1 is of the in-cylinder direct injection type, the electronic control device 60 advances the supply timing of hydrogen as the ratio of specific heats of the circulation gas becomes smaller and retards the supply timing of hydrogen as the ratio of specific heats of the circulation gas becomes larger. When, for example, the ratio of specific heats of the circulation gas drops, the electronic control device 60 executes a correction for advancing the supply timing of hydrogen in response to the drop of the ratio of specific heats as described above. Accordingly, even if an ignition delay time exists, since the engine 1 can advance a combustion completion timing of hydrogen, the engine 1 can improve the combustion of hydrogen and can obtain the stable output. With the operation, even when the ratio of specific heats of the circulation gas changes and the combustion condition of hydrogen in the combustion chamber 11 varies, the engine 1 can suppress the drop of the heat efficiency and can obtain the stable output.

Further, when, for example, the engine 1 includes the ignition plug 17, the electronic control device 60 advances the ignition timing of hydrogen as the ratio of specific heats of the circulation gas becomes smaller and retards the ignition timing of hydrogen as the ratio of specific heats of the circulation gas becomes larger. When, for example, the ratio of specific heats of the circulation gas drops, the electronic control device 60 advances the ignition timing of hydrogen in response to the drop of the ratio of specific heats as described above. Thus, even if the ignition delay time exists, since the engine 1 can advance the combustion completion time of hydrogen, the engine 1 can improve the combustion of hydrogen and can obtain the stable output. With the operation, even when the ratio of specific heats of the circulation gas changes and the combustion condition of hydrogen in the combustion chamber 11 varies, the engine 1 can suppress the drop of the heat efficiency and can obtain the stable output.

Further, for example, the electronic control device 60 increases the supply amount of hydrogen as the ratio of specific heats of the circulation gas becomes smaller and reduces the supply amount of hydrogen as the ratio of specific heats of the circulation gas becomes larger. When, for example, the ratio of specific heats of the circulation gas drops, since the electronic control device 60 executes the correction for increasing the supply amount of hydrogen in response to the drop of the ratio of specific heats as described above, the engine 1 can improve the combustion of hydrogen and can obtain the stable output. With the operation, even when the ratio of specific heats of the circulation gas changes and the combustion condition of hydrogen in the combustion chamber 11 varies, the engine 1 can suppress the output change to the accelerator opening degree caused by that the heat efficiency changes and can obtain the stable output. Note that when the electronic control device 60 corrects the supply amount of hydrogen in response to the ratio of specific heats of the circulation gas, the electronic control device 60 preferably corrects also the supply amount of oxygen in proportion to a correction amount of hydrogen.

Next, an example of control in the engine 1 will be explained referring to a flowchart of FIG. 3. Note that these control routines are repeatedly executed in a control cycle of several milliseconds to several tens of milliseconds.

First, the electronic control device 60 detects the ratio of specific heats of the circulation gas circulating in the circulation path 20 (S100). The electronic control device 60 can estimate the ratio of specific heats of the circulation gas based on, for example, volume ratios and pressure ratios of the circulation gas before and after the circulation gas sucked into the combustion chamber 11 is compressed by the piston 16. Here, as an example, the electronic control device 60 detects the ratio of specific heats of the circulation gas circulating in the circulation path 20 based on a crank angle and an in-cylinder pressure detected by the crank angle sensor 62 and the in-cylinder pressure sensor 63. In the case, the crank angle sensor 62 and the in-cylinder pressure sensor 63 act as a ratio of specific heats detection means for detecting the ratio of specific heats of the circulation gas circulating in the circulation path 20.

As shown in, for example, FIG. 4, when the in-cylinder pressure at a crank angle t1 before the compression by the piston 16 (a closed period of the suction valve 14) is shown by "P1", a volume of the combustion chamber 11 at the crank angle t1 is shown by "V1", the in-cylinder pressure at a crank angle t2 after the compression by the piston 16 (before a start of the combustion of hydrogen) is shown by "P2", the volume of the combustion chamber 11 at the crank angle t2 is shown by "V2", and the ratio of specific heats of the circulation gas circulating in the circulation path 20 is shown by "k", the relation therebetween can be shown by the following basic expression (1).

$$P1 V1^k = P2 V2^k \quad (1)$$

The volumes V1 and V2 of the combustion chamber 11 in the basic expression (1) are unambiguously determined in response to the crank angles detected by the crank angle sensor 62, and the in-cylinder pressures P1, P2 can be obtained from a result of detection by the in-cylinder pressure sensor 63. Accordingly, the electronic control device 60 can calculate the ratio of specific heats of the circulation gas circulating in the circulation path 20 from the crank angles and the in-cylinder pressures using the basic expression (1).

Returning to FIG. 3, next, the electronic control device 60 compares the ratio of specific heats of the circulation gas detected at S100 with a previously set first predetermined value and determines whether or not the ratio of specific heats of the circulation gas is larger than the first predetermined value (S102). Here, the first predetermined value is a determination value previously set to the ratio of specific heats of the circulation gas and typically corresponds to a reference ratio of specific heats of the circulation gas used when the reference control parameter described above is set.

When the electronic control device 60 determines that the ratio of specific heats of the circulation gas is larger than the first predetermined value (S102: Yes), the electronic control device 60 executes any one or all of a correction for retarding the injection timing (supply timing) of a hydrogen in-cylinder injection, a correction for retarding the ignition timing of hydrogen, or a correction for reducing the supply amounts of oxygen and hydrogen to the reference control parameter (S104), executes the ignition or the supply of hydrogen and oxygen based on a finally corrected control parameter, finishes a control cycle at the time, and goes to a next control cycle.

Here, the electronic control device 60 determines a correction amount for correcting the reference supply timings, the reference ignition timing, or the reference supply amounts which are the reference control parameter based on, for example, a control map exemplified in FIG. 5. In the control map, a horizontal axis shows the ratio of specific heats of the circulation gas and a vertical axis shows the correction amounts of the supply timings, the ignition timing, and the supply amounts. The control map describes the relation between the ratio of specific heats of the circulation gas and the respective correction amounts. In the control map, the respective correction amounts of the supply timings and the ignition timing change so as to be corrected to a retard side as the ratio of specific heats of the circulation gas increases, and the correction amounts of the supply amounts change so as to be corrected to an amount reduction side as the ratio of specific heats of the circulation gas increases. The control map is stored in a storage unit of the electronic control device 60 after the relation between the ratio of specific heats of the circulation gas and the respective correction amounts is previously set. The electronic control device 60 determines the correction amounts from the ratio of specific heats of the circulation gas detected at S100 based on the control map and corrects the reference supply timing, the reference ignition timing or the reference supply amounts in response to the determined correction amounts. Note that, in the embodiment, although the electronic control device 60 determines the correction amounts using the control map exemplified in FIG. 5, the embodiment is not limited thereto. The electronic control device 60 may determine the correction amounts based on, for example, a mathematical expression corresponding to the control map exemplified in FIG. 5.

Returning to FIG. 3, when the electronic control device 60 determines at S102 that the ratio of specific heats of the circulation gas is equal to or less than the first predetermined value (S102: No), the electronic control device 60 compares the ratio of specific heats of the circulation gas detected at S100 with the first predetermined value and determines whether or not the ratio of specific heats of the circulation gas is smaller than the first predetermined value (S106).

When the electronic control device 60 determines that the ratio of specific heats of the circulation gas is smaller than the first predetermined value (S106: Yes), the electronic control device 60 executes any one or all of a correction for advancing the injection timing (supply timing) of the hydrogen in-cylinder injection, a correction for advancing the ignition timing of hydrogen or a correction for increasing the supply amounts of oxygen and hydrogen to the reference control parameter (S108), executes the ignition or the supply of hydrogen and oxygen based on a finally corrected control parameter, finishes a control cycle at the time, and goes to a next control cycle. The electronic control device 60 determines the correction amounts from the ratio of specific heats of the circulation gas detected at S100 based on the control map exemplified in FIG. 5 and corrects the reference supply timing, the reference ignition timing, or the reference supply amounts in response to the determined correction amounts.

When the electronic control device 60 determines at S106 that the ratio of specific heats of the circulation gas is equal to or more than the first predetermined value (S106: No), the electronic control device 60 executes the supply and the ignition of hydrogen and oxygen based on the reference control parameter that is not corrected, finishes a control cycle at the time, and goes to a next control.

According to the engine 1 according to the embodiment of the present invention described above, there are provided the combustion chamber 11 in which argon having a ratio of specific heats higher than air can be expanded by the combustion of hydrogen, the circulation path 20 in which a gas containing argon can be circulated from the gas exhaust side to the gas suction side of the combustion chamber 11 and can be supplied to the combustion chamber 11 again, and the electronic control device 60 which changes the control parameter for controlling the combustion of hydrogen based on the ratio of specific heats of the circulation gas circulating in the circulation path 20. Accordingly, even when, for example, impurities are mixed with the circulation gas and the ratio of specific heats of the circulation gas changes, since the engine 1 can be operated so that an optimum drive condition can be obtained in response to the ratio of specific heats of the circulation gas, the engine 1 can obtain the stable output.

Second Embodiment

Figure 6:
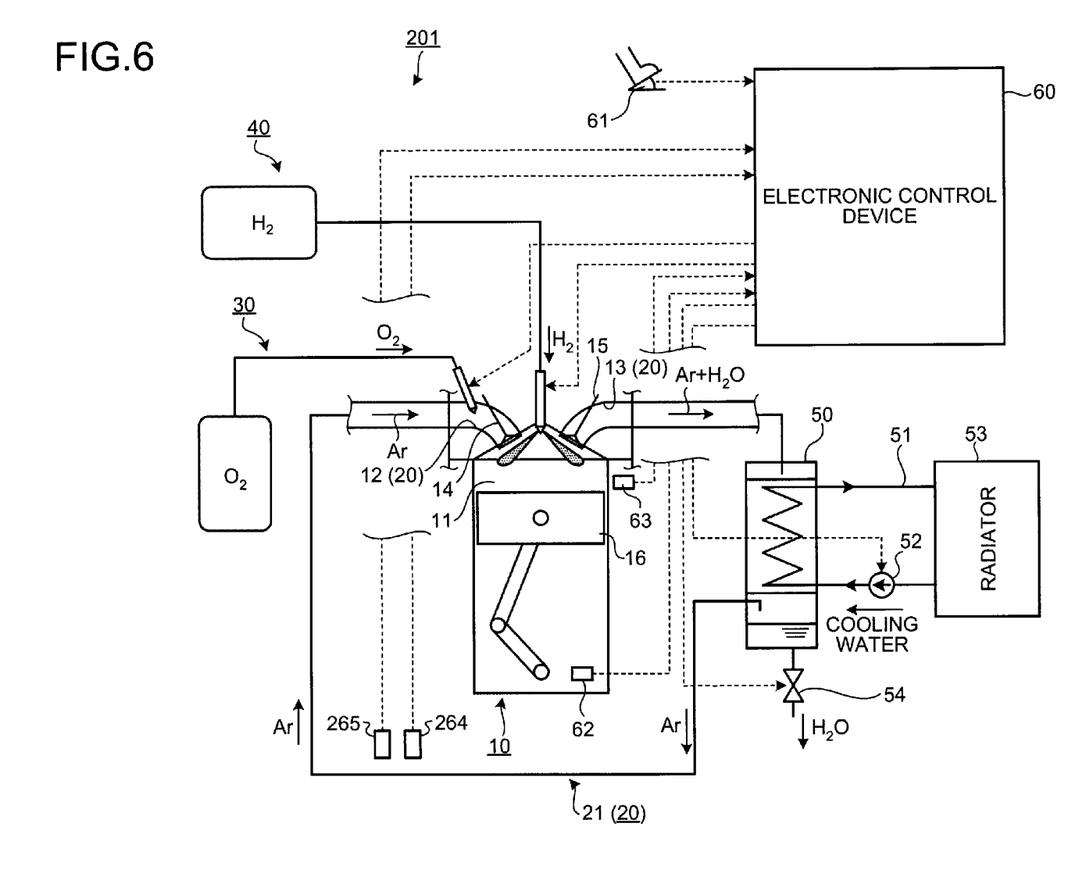
FIG. 6 is a schematic configuration view of an engine according to a second embodiment.
Figure 7:
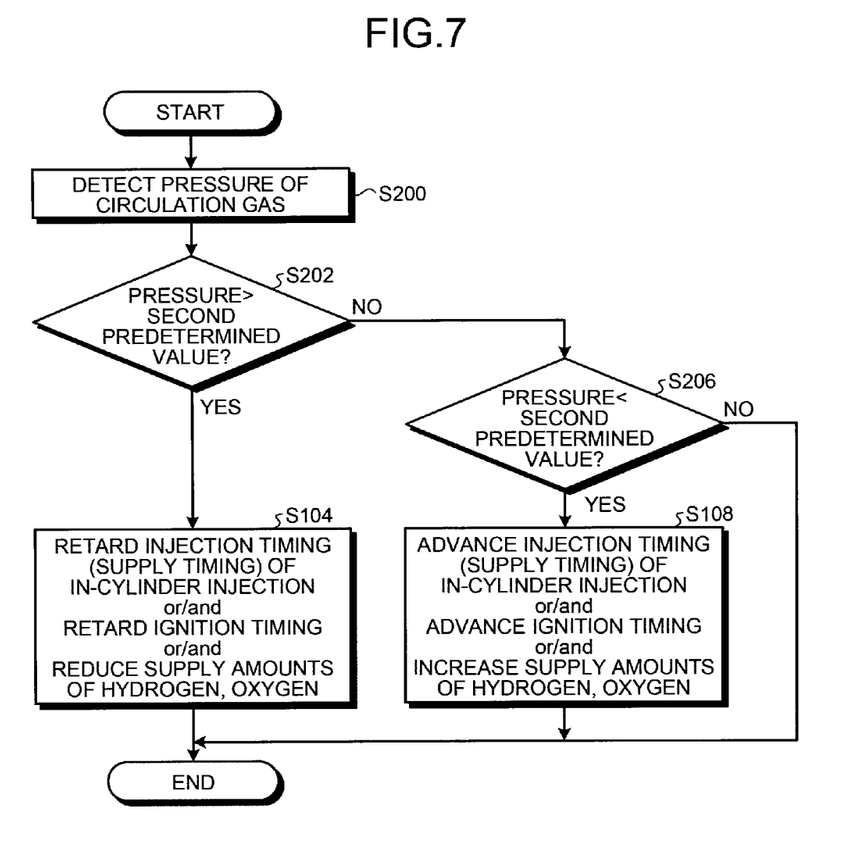
FIG. 7 is a flowchart explaining an example of control in the engine according to the second embodiment.
Figure 8:
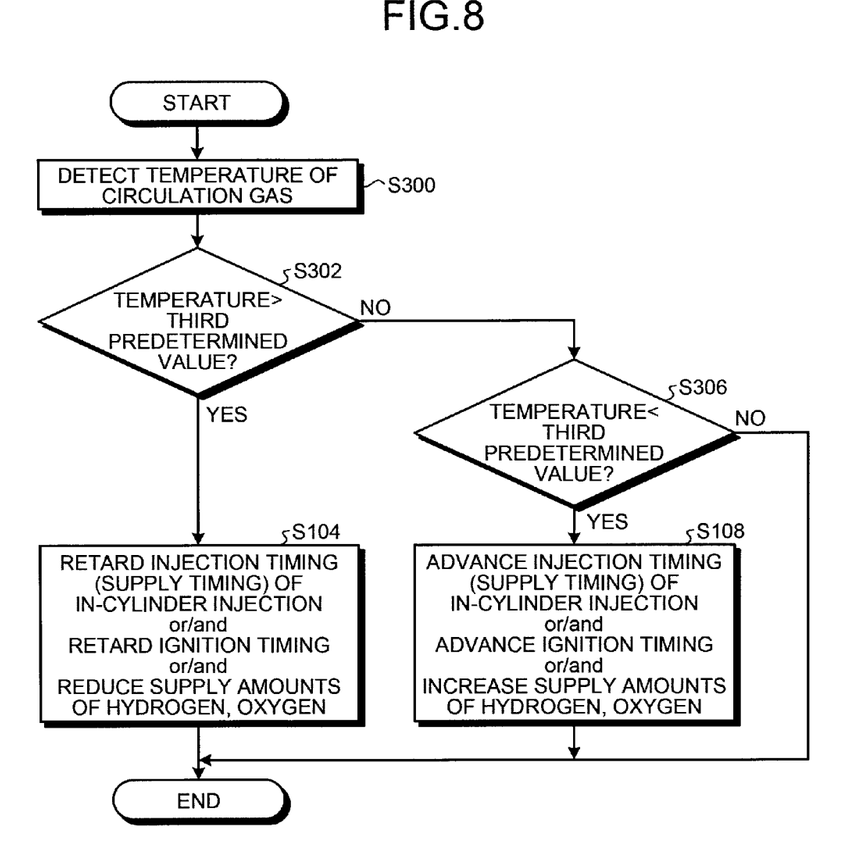
FIG. 8 is a flowchart explaining an example of control in the engine according to the second embodiment.

FIG. 6 is a schematic configuration view of an engine according to a second embodiment and FIG. 7 and FIG. 8 are flowcharts explaining an example of control in the engine according to the second embodiment. The working gas circulation type engine according to the second embodiment is different from the working gas circulation type engine according to first embodiment in that a control parameter is changed based on a pressure or a temperature of a gas circulating in a circulation path. In addition to the above-mentioned, a duplicate explanation as to configurations, operations and effects common to the embodiment described above is omitted as far as possible, and the same components are denoted by same reference numerals.

As shown in FIG. 6, an engine 201 as the working gas circulation type engine of the embodiment includes a pressure sensor 264 as a pressure detection means for detecting a pressure of a circulation gas circulating in a circulation path 20 and a temperature sensor 265 as a temperature detection means for detecting a temperature of the circulation gas circulating in the circulation path 20.

In the engine 201, there is a possibility that a combustion condition of hydrogen in a combustion chamber 11 varies by, for example, that a pressure and a temperature of the circulation gas also changes by a change of mol amount of the circulation gas caused by a mixture of an unnecessary impure gas in the circulation gas due to a leakage of argon and the like to the outside, a change of an outside air temperature, and the like. Thus, an electronic control device 60 of the embodiment changes a control parameter based on the pressure or the temperature of the circulation gas detected by the pressure sensor 264 and the temperature sensor 265 in addition to a ratio of specific heats of the circulation gas as a parameter for showing a state of the circulation gas. With the operation, since the engine 201 can be operated so that a drive condition becomes more optimum in response to a composition and a change of state of the circulation gas, the engine 201 can obtain a more stable output.

Specifically, the electronic control device 60 changes (corrects) the control parameter so that a combustion of hydrogen is more improved as the pressure of the circulation gas in the circulation path 20 becomes smaller or the temperature of the circulation gas in the circulation path 20 becomes lower.

When, for example, the engine 201 is of an in-cylinder direct injection type, the electronic control device 60 advances a supply timing of hydrogen as the pressure and the temperature of the circulation gas become smaller and retards the supply timing of hydrogen as the pressure and the temperature of the circulation gas becomes larger. Further, when the engine 201 includes an ignition plug 17, the electronic control device 60 advances an ignition timing of hydrogen as the pressure and the temperature of the circulation gas becomes smaller and retards the ignition timing of hydrogen as the pressure and the temperature of the circulation gas becomes larger. With the operation, even when the pressure and the temperature of the circulation gas changes by that impurities are contained in the circulation gas and the outside air temperature changes and thus the combustion condition of hydrogen in the combustion chamber 11 varies, the engine 201 can be operated in a more optimum operation state. That is, after compression by the piston 16, even if an ignition delay time and a combustion period of hydrogen change by that the pressure and the temperature in the combustion chamber 11 just before the combustion of hydrogen changes, the engine 201 can be operated in an optimum operation state, can suppress a drop of a heat efficiency, and can obtain the more stable output.

Further, the electronic control device 60 increases a supply amount of hydrogen as the temperature and the pressure of the circulation gas becomes smaller and reduces the supply amount of hydrogen as the temperature and the pressure of the circulation gas becomes larger. With the operation, even when the temperature and the pressure of the circulation gas changes and the combustion condition of hydrogen in the combustion chamber 11 varies, the engine 201 can suppress an output change to an accelerator opening degree caused by that the heat efficiency changes and can obtain the more stable output.

Next, an example of control in the engine 201 will be explained referring to the flowcharts of FIG. 7 and FIG. 8. Note that, also here, the points different from the controls explained in FIG. 3 will be mainly explained.

In control exemplified in FIG. 7, first, the electronic control device 60 detects the pressure of the circulation gas circulating in the circulation path 20 (S200). The pressure of the circulation gas can be obtained from a result of detection by the pressure sensor 264.

Next, the electronic control device 60 compares the pressure of the circulation gas detected at S200 with a previously set second predetermined value and determines whether or not the pressure of the circulation gas is larger than the second predetermined value (S202). Here, the second predetermined value is a determination value previously set to the pressure of the circulation gas and typically corresponds to a reference pressure of the circulation gas used when the reference control parameter described above is set.

When the electronic control device 60 determines that the pressure of the circulation gas is larger than the second predetermined value (S202: Yes), the electronic control device 60 executes a process similar to S104 described above, finishes a control cycle at the time, and goes to a next control cycle. However, in the case, the electronic control device 60 determines correction amounts from the pressure of the circulation gas detected at S200 based on the control map exemplified in FIG. 5 and corrects reference supply timings, a reference ignition timing, or reference supply amounts in response to the determined correction amounts. In the case, as exemplified in parentheses of FIG. 5, in the control map, a horizontal axis shows a pressure of the circulation gas and a vertical axis shows correction amounts of supply timings, an ignition timing, and supply amounts. In the control map, respective correction amounts of the supply timings and the ignition timing change so as to be corrected to a retard side as the pressure of the circulation gas increases and correction amounts of the supply amounts change so as to be corrected to an amount reduction side as the pressure of the circulation gas increases.

When the electronic control device 60 determines at S202 that the pressure of the circulation gas is equal to or less than the second predetermined value (S202: No), the electronic control device 60 compares the pressure of the circulation gas detected at S200 with the second predetermined value and determines whether or not the pressure of the circulation gas is smaller than the second predetermined value (S206). When the electronic control device 60 determines that the pressure of the circulation gas is smaller than the second predetermined value (S206: Yes), the electronic control device 60 executes a process similar to S108 described above, finishes a control cycle at the time, and goes to a next control cycle. When the electronic control device 60 determines at S206 that the pressure of the circulation gas is equal to or more than the second predetermined value (S206: No), the electronic control device 60 finishes the control cycle at the time and goes to the next control cycle.

Likewise, in control exemplified in FIG. 8, first, the electronic control device 60 detects a temperature of the circulation gas circulating in the circulation path 20 (S300). The temperature of the circulation gas can be obtained from a result of detection by the temperature sensor 265.

Next, the electronic control device 60 compares the temperature of the circulation gas detected at S300 with a previously set third predetermined value and determines whether or not the temperature of the circulation gas is larger than the third predetermined value (S302). Here, the third predetermined value is a determination value previously set to the temperature of the circulation gas and typically corresponds to a reference temperature of the circulation gas used when the reference control parameter described above is set.

When the electronic control device 60 determines that the temperature of the circulation gas is larger than the third predetermined value (S302: Yes), the electronic control device 60 executes a process similar to S104 described above, finishes a control cycle at the time, and goes to a next control cycle. However, in the case, the electronic control device 60 determines the correction amounts from the temperature of the circulation gas detected at S300 based on the control map exemplified in FIG. 5 and corrects the reference supply timings, the reference ignition timing or the reference supply amounts in response to the determined correction amounts. In the case, as exemplified in parentheses of FIG. 5, in the control map, a horizontal axis shows a temperature of the circulation gas and a vertical axis shows the correction amounts of the supply timing, the ignition timing, and the supply amounts. In the control map, the respective correction amounts of the supply timings and the ignition timing change so as to be corrected to a retard side as the temperature of the circulation gas increases and correction amounts of the supply amounts change so as to be corrected to an amount reduction side as the temperature of the circulation gas increases.

When the electronic control device 60 determines at S302 that the temperature of the circulation gas is equal to or less than the third predetermined value (S302: No), the electronic control device 60 compares the temperature of the circulation gas detected at S300 with the third predetermined value and determines whether or not the temperature of the circulation gas is smaller than the third predetermined value (S306). When the electronic control device 60 determines that the temperature of the circulation gas is smaller than the third predetermined value (S306: Yes), the electronic control device 60 executes a process similar to S108 described above, finishes a control cycle at the time, and goes to a next control cycle. When the electronic control device 60 determines at S306 that the temperature of the circulation gas is equal to or more than the third predetermined value (S306: No), the electronic control device 60 finishes the control cycle at the time, and goes to the next control cycle.

Note that it is sufficient that the controls of FIG. 7 and FIG. 8 are executed in parallel with the control of FIG. 3, that is, it is sufficient that the electronic control device 60 corrects the control parameter in response to the ratio of specific heats and the pressure and the temperature of the circulation gas and executes a supply and an ignition of hydrogen and oxygen based on a finally corrected control parameter.

According to the engine 201 according to the embodiment of the present invention explained above, the electronic control device 60 changes the control parameter based on the pressure or the temperature of the gas circulating in the circulation path 20. Accordingly, even when, for example, impurities are contained in the circulation gas and the pressure or the temperature of the circulation gas changes, since the engine 201 can be operated so that the drive condition becomes optimum in response to the temperature and the pressure of the circulation gas, the engine 201 can obtain a more stable output.

Note that the working gas circulation type engine according to the embodiment of the present invention described above is not restricted to the embodiment described above and can be variously changed within a scope described in claims. The working gas circulation type engine according to the embodiment of the present invention may be configured by combining plural sets of the embodiments explained above.

The engine 201 explained above has been explained such that the electronic control device 60 corrects the control parameter in response to the ratio of specific heats and the pressure and the temperature of the circulation gas, the engine 201 is not limited thereto. The electronic control device 60 may correct the control parameter in response to the ratio of specific heats and the pressure of the circulation gas regardless of the temperature of the circulation gas and may correct the control parameter in response to the ratio of specific heats and temperature of the circulation gas regardless of the pressure of the circulation gas.

The working gas circulation type engine explained above has been explained such that the oxidizing agent is oxygen and the fuel is hydrogen, the working gas circulation type engine is not limited thereto and may be any engine as long as a working gas can be expanded in a combustion chamber by combustion of a fuel. Further, the working gas explained above is not limited to argon and may be, for example, a rare gas such as helium (He) and the like that is a monoatomic gas.

INDUSTRIAL APPLICABILITY

As described above, the working gas circulation type engine according to the present invention is preferably applied to various working gas circulation type engines which can circulate a working gas from a gas exhaust side to a gas suction side of a combustion chamber and supply the working gas to the combustion chamber again.

REFERENCE SIGNS LIST

1, 201 ENGINE (WORKING GAS CIRCULATION TYPE ENGINE)
10 ENGINE MAIN BODY
11 COMBUSTION CHAMBER
20 CIRCULATION PATH
30 OXYGEN SUPPLY DEVICE
40 HYDROGEN SUPPLY DEVICE
50 CONDENSER
60 ELECTRONIC CONTROL DEVICE (CONTROL DEVICE)
61 ACCELERATOR OPENING DEGREE SENSOR
62 CRANK ANGLE SENSOR
63 IN-CYLINDER PRESSURE SENSOR
264 PRESSURE SENSOR
265 TEMPERATURE SENSOR

The invention claimed is:

1. A working gas circulation type engine comprising:
a working gas having a ratio of specific heats higher than that of air;
a combustion chamber in which the working gas can be expanded by combustion of a fuel;
a circulation path capable of circulating a gas containing the working gas from a gas exhaust side to a gas suction side of the combustion chamber without discharging the working gas to atmosphere and supplying the working gas to the combustion chamber again; and
a control device that changes a control parameter for controlling the combustion of the fuel based on a ratio of specific heats of the gas circulating in the circulation path.

2. The working gas circulation type engine according to claim 1, wherein the control device changes the control parameter so that the combustion of the fuel is improved as the ratio of specific heats of the gas circulating in the circulation path becomes smaller.

3. The working gas circulation type engine according to claim 2, wherein the control device changes the control parameter based on a pressure or a temperature of the gas circulating in the circulation path.

4. The working gas circulation type engine according to claim 2, wherein the control parameter includes at least any one of a supply timing for supplying the fuel into the combustion chamber, an ignition timing for igniting the fuel in the combustion chamber, or a supply amount of the fuel supplied to the combustion chamber.

5. The working gas circulation type engine according to claim 2, wherein the control device executes at least any one of control for advancing a supply timing for supplying the fuel to the combustion chamber as a ratio of specific heats of a gas circulating in the circulation path becomes smaller, control for advancing an ignition timing for igniting the fuel in the circulation path as a ratio of specific heats of a gas circulating in the circulation path becomes smaller, or control for increasing a supply amount of the fuel supplied to the combustion chamber as a ratio of specific heats of a gas circulating in the circulation path becomes smaller.

6. The working gas circulation type engine according to claim 1, wherein the control device changes the control parameter based on a pressure or a temperature of the gas circulating in the circulation path.

7. The working gas circulation type engine according to claim 6, wherein the control parameter includes at least any one of a supply timing for supplying the fuel into the combustion chamber, an ignition timing for igniting the fuel in the combustion chamber, or a supply amount of the fuel supplied to the combustion chamber.

8. The working gas circulation type engine according to claim 6, wherein the control device executes at least any one of control for advancing a supply timing for supplying the fuel to the combustion chamber as a ratio of specific heats of a gas circulating in the circulation path becomes smaller, control for advancing an ignition timing for igniting the fuel in the circulation path as a ratio of specific heats of a gas circulating in the circulation path becomes smaller, or control for increasing a supply amount of the fuel supplied to the combustion chamber as a ratio of specific heats of a gas circulating in the circulation path becomes smaller.

9. The working gas circulation type engine according to claim 1, wherein the control parameter includes at least any one of a supply timing for supplying the fuel into the combustion chamber, an ignition timing for igniting the fuel in the combustion chamber, or a supply amount of the fuel supplied to the combustion chamber.

10. The working gas circulation type engine according to claim 9, wherein the control device executes at least any one of control for advancing a supply timing for supplying the fuel to the combustion chamber as a ratio of specific heats of a gas circulating in the circulation path becomes smaller, control for advancing an ignition timing for igniting the fuel in the circulation path as a ratio of specific heats of a gas circulating in the circulation path becomes smaller, or control for increasing a supply amount of the fuel supplied to the combustion chamber as a ratio of specific heats of a gas circulating in the circulation path becomes smaller.

11. The working gas circulation type engine according to claim 1, wherein the control device executes at least any one of control for advancing a supply timing for supplying the fuel to the combustion chamber as a ratio of specific heats of a gas circulating in the circulation path becomes smaller, control for advancing an ignition timing for igniting the fuel in the circulation path as a ratio of specific heats of a gas circulating in the circulation path becomes smaller, or control for increasing a supply amount of the fuel supplied to the combustion chamber as a ratio of specific heats of a gas circulating in the circulation path becomes smaller.

* * * * *